Sept. 17, 1935.   C. A. BORTON   2,014,612
PROCESS OF PRODUCING A CAM FOLLOWER
Filed Dec. 22, 1932
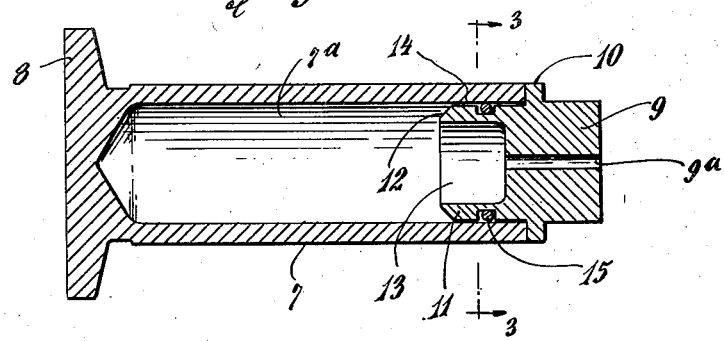
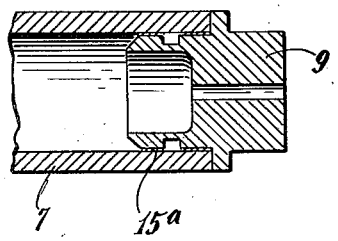 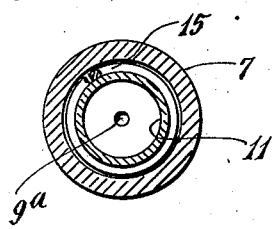
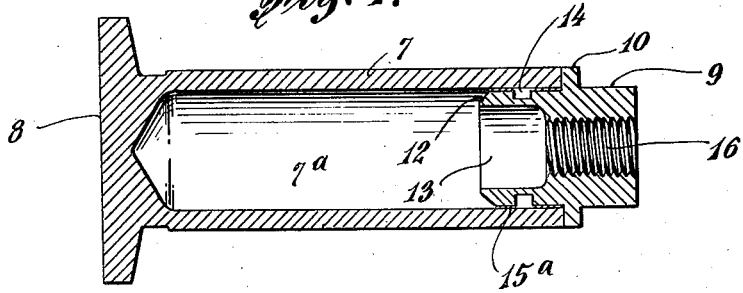
INVENTOR
CLEMENT A. BORTON
BY
ATTORNEY Patented Sept. 17, 1935

2,014,612

UNITED STATES PATENT OFFICE 2,014,612

PROCESS OF PRODUCING A CAM FOLLOWER

Clement A. Borton, Llanerch, Pa., assignor to The Autocar Company, Ardmore, Pa., a corporation of Pennsylvania Application December 22, 1932, Serial No. 648,323

4 Claims. (Cl. 29—156.7)

This invention relates generally to manufactured articles and brazing processes used in their production and is more particularly directed to the construction and assembly of machine parts and similar devices embodying telescoped tubular or cylindrical elements and a method and means of utilizing a brazing agent or material in effecting the jointure of such elements.

While my invention, as above pointed out, possesses a wide range of utility, for the purposes of this disclosure I have elected to describe it more or less specifically as it may be practiced in the manufacture of certain units entering into the construction of an internal combustion engine, as the so-called valve plungers or cam followers. However, this is not to be construed, in any way, as a limitation of my invention to this particular article of manufacture or to the steps of the process followed in its production, my invention, as hereinafter will become evident, being susceptible of application in the production of numerous other devices.

As is well known, the cam followers or valve plungers employed in internal combustion engine design, conventionally embody a cylindrical bearing portion provided with a roller or an integral surface of a so-called mushroom shape at one end, adapted for engagement with a cooperating cam on the engine cam shaft, while an adjusting screw for making contact with the valve stem, or a push rod, as in an overhead valve engine, is supported from the opposite end thereof. Various methods are utilized for mounting the adjusting screw on the bearing member, these usually involving a multiplicity of machine and assembly operations which, of course, result in relatively high production costs. For example, it is the more or less standard practice to tap the bore of the bearing member for a considerable part of its length to receive an externally and internally threaded sleeve or bushing in which the adjusting screw is entered, although in some instances the adjusting screw is threaded directly into the upper end of the bore, which is tapped for the purpose. This, however, is not generally satisfactory, due to the relatively thin wall section of the bearing member in the adjusting screw-supporting zone, which obviously reduces the strength of the piece in resisting the detrimental side thrusts and vertical forces.

Many other articles of manufacture, especially machine parts, which correspond generally in structure or in function to the valve plungers or cam followers heretofore described, present the same problem in production costs and the primary object of this invention is to provide a method and means of eliminating operations now required in the manufacture of such articles or devices with a concomitant saving in the cost of production.

More specifically, the object of this invention is to provide a method and means of producing a cam follower or valve plunger for assembly in the construction of an internal combustion engine, of assembly elements, permanently united to produce a device having the characteristics of a unitary structure in resisting the detrimental forces to which it is subjected in the performance of its intended function.

Another object of my invention is to provide a method of effecting a permanent jointure between two telescopically connected members, as the bearing portion of a cam follower or valve plunger and the adjusting screw-supporting surface thereof in a simple and economical manner, the union of the two components of the device being accomplished incidental to or during another operation through which it must pass in the process of manufacture.

It is also an important object of this invention to provide a method of brazing and mechanical means formed to cooperate with a brazing material whereby the union of two normally separate and appropriately prepared elements may be effected during another step in the process of manufacture of the article of which such elements are components, wherein such article is submitted to a heat treatment.

My invention also contemplates a process or method of brazing and thereby permanently uniting two normally separate components of a predetermined article of manufacture which may be performed concurrently with another heat treatment of such article and provide a jointure or union of the opposed surfaces of such components that will resist dissolution or decomposition at a temperature to which said article must be submitted in a subsequent step of manufacture requiring the application of heat thereto.

Other objects and advantages flowing from the practicing of my invention will doubtless present themselves as the description proceeds, and I would have it clearly understood that I reserve unto myself all rights to the full range of equivalents, both in the structure and the sequence of the steps of the method, as well as the avenues of use, to which I may be entitled under my invention in its broadest aspect.

In the accompanying drawing I have shown a form of cam follower or valve plunger which may be produced in accordance with my invention, but it is obvious that the articles or devices in the manufacture of which my process may be utilized may take other forms and that the mechanical means which are essential to the efficient performance of my brazing method or process may be varied, as conditions demand within the purview of the appended claims.

In the drawing:

Figure 1 is a longitudinal section of a cam follower or valve plunger showing the assembly of the parts for the performance of the operation during which the brazing step is effected, the brazing material being in position within the retaining groove of the head end of the device.

Figure 2 is a view similar to Figure 1 of a fragment of the cam follower, showing the disposition of the brazing material between the opposed surfaces of the components of the device, following the completion of the brazing step.

Figure 3 is a transverse section on the line 3—3 of Figure 1, and

Figure 4 is a longitudinal section of the completed cam follower or valve plunger, showing the head end tapped for the reception of the adjusting screw.

Referring now to the drawing in detail, in which like characters of reference are employed to designate similar parts in the several views, 7 indicates the body or bearing portion of the cam follower or valve plunger, which is of a conventional design and is provided with a so-called mushroom-shaped cam engaging surface 8 integral therewith, this unit being produced in the usual manner by screw machine operations.

As will be observed, in lieu of the usual sleeve threaded into the bearing portion 7 of the device to receive the adjusting screw, I provide a specially formed head 9, preferably of the configuration shown, which is of two diameters, the portion 11 below the flange 10 being slightly undercut to enter the bore 7a of the bearing element 7. This entering end may be bevelled or chamfered as at 12 and is preferably formed with a recess 13 which communicates with the central bore 9a passing through the head, the purpose of which will be hereinafter explained.

One or more peripheral grooves 14 may be formed on the insertable portion of said head 9 for the reception of a ring of brazing material 15 which is positioned in said groove prior to the location of the head 9 within the bore of the piece 7 and subsequent to the application of a suitable flux thereto as by dipping or immersing the recessed end of the head 9 in a bath or solution of borax, for example.

As is well known, in the production of devices of the nature which is being considered, it is customary to submit them to a carburizing treatment, preparatory to hardening by a proper heat treatment at a later time. Therefore, the brazing material which I employ in the practicing of my invention is so constituted that it will fuse or melt at a temperature between 1600 and 1650 degrees Fahrenheit, or at some appropriate temperature below that at which the carburizing step is effected and above the maximum temperature present in the hardening treatment.

Now, assuming that the insertable head 9 has been dipped or immersed in a suitable flux as heretofore described, and that the parts are assembled as shown in Figure 1, with the brazing material 15 located in the groove 14 of the head 9, the complete assembly is ready for the usual carburizing step which takes place in a temperature of approximately 1700 degrees Fahrenheit. Since the brazing material fuses or melts below this temperature, as at 1600 degrees, for instance, it will be obvious that when the assembly is subjected to the carburizing treatment, the brazing agent will melt and expand between the opposed surfaces of the bearing member 7 and the portion 11 of the head 9, as indicated at 15a in Figures 2 and 4, respectively, and effect a permanent jointure or union thereof, when permitted to cool and harden. In this connection it may be pointed out that the bore 9a functions as a vent to prevent the building up of pressure within the bore 7a and the recess 13 during the carburizing treatment which would act to dislocate the head 9 relative to the bearing portion 7 of the assembly. Following the carburizing step, the unit composed of the parts 7 and 9, integrally united, may be subjected to hardening, the temperature in this treatment ranging between 1400 and 1440 degrees Fahrenheit, or with a maximum sufficiently below the melting point of the brazing material to insure the maintenance of the union between the two components of the cam follower. Subsequently, the device may be finished by grinding and the necessary drilling and tapping operations to provide the head for the reception of the adjusting screw, as indicated at 16 in Figure 4.

From the foregoing it will be apparent that I have provided a simple, economical and highly efficient method of performing a brazing step for uniting telescopically associated parts of an assembled structure concurrently with the performance of another step in the process of production or manufacture of such assembled device, which involves a heat treatment thereof, the material which I employ in my brazing step possessing characteristics which render it possible to subject the device to subsequent and other forms of heat treatments, where desirable or necessary without danger of impairment in any way of the jointure produced by the fusion of the brazing agent.

As heretofore pointed out, in lieu of the single groove 14, a plurality of peripheral grooves may be provided on the insert, as the head 9, for the reception of brazing material or the inner surface of the insert receiving member, as the bearing portion 7, may be formed with appropriate grooves or undercut surfaces adjacent the end thereof which is entered by the insert, within which the brazing agent may be disposed. Also, as will be obvious, the head of a cam follower or valve plunger made in conformity with my invention may take other shapes, to meet requirements of particular engine designs, all of these structural modifications falling within the spirit and scope of my invention, the objectives of which have been heretofore set forth.

I claim:

1. A method of producing a cam follower for internal combustion engines, embodying a head member telescoped into the open end of a cylindrical body member formed with a cam-engaging surface, which consists in associating a brazing material with the entering end of said head member, inserting the entering end of the head member into the open end of the body member to completely enclose the brazing material between the opposed surfaces of the two members, and then subjecting the assembly to a carburizing temperature to render the brazing material effective in uniting the opposed surfaces of the head and body members simultaneously with the carburization of the assembly.

2. The process of making a cam follower for an internal combustion engine, embodying a head member telescoped into the open end of a cylindrical body member formed with a cam-engaging surface, which consists in associating a brazing material fusible at a temperature substantially less than 1700° F. with the entering end of said head member, inserting the entering end of said head member into the open end of the body member to completely enclose the brazing material between the opposed surfaces of the two members, then subjecting the assembly to a temperature of approximately 1700° F. to carburize said assembly and simultaneously render the brazing material effective in uniting the opposed surfaces of the head and body members and then exposing the assembly to a temperature under 1500° in a hardening operation.

3. The process of making a cam follower for an internal combustion engine, which consists in forming a cam-engaging surface at one end of a hollow cylindrical body member, shaping a head member to enter the open end of said body member telescopically and abut upon the defining edge of such open end, forming a recess in the entering end of said head member and extending an axial bore therefrom to the other end of the latter member, producing a peripheral groove upon the entering end of said head member, inserting in said groove a ring of brazing material in association with a flux therefor, assembling the members with the head member portion carrying the brazing material entered into the body member and a part of the head member abutting upon the rim of the body member, the brazing material being completely enclosed between the opposed surfaces of the two members, then submitting the assembly to a temperature to simultaneously effect carburization of the piece and fuse the brazing material for integrally uniting the opposed surfaces of the two members and subsequently subjecting the assembly to a hardening operation at a temperature below the fusing point of the brazing material.

4. A method of producing a cam follower for an internal combustion engine, embodying a head member telescoped into the open end of a cylindrical body member formed with a cam-engaging surface, which consists in providing the entering member with a peripheral groove, associating a flux with the entering member, locating a quantity of brazing material in said groove, then inserting the entering end of said head member into the open end of the body member to completely enclose the brazing material between the opposed surfaces of the two members, and then subjecting the assembly to a carburizing temperature to render the brazing material effective in uniting the opposed surfaces of the head and body members, simultaneously with the carburization of the cam follower assembly.

CLEMENT A. BORTON.